(12) United States Patent
Kim (10) Patent No.: US 10,538,154 B2
(45) Date of Patent: Jan. 21, 2020

(54) SMART ACTIVE MOUNT

(71) Applicants: Hyundai Motor Company, Seoul (KR); Kia Motors Corporation, Seoul (KR)

(72) Inventor: Seung Won Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 4 days.

(21) Appl. No.: 15/696,081

(22) Filed: Sep. 5, 2017

(65) Prior Publication Data

US 2018/0281579 A1 Oct. 4, 2018

(30) Foreign Application Priority Data

Mar. 29, 2017 (KR) ........................ 10-2017-0039787

(51) Int. Cl.
*F16F 13/22* (2006.01)
*B60K 5/12* (2006.01)
*F16F 13/10* (2006.01)
*F16F 13/26* (2006.01)

(52) U.S. Cl.
CPC .......... *B60K 5/1283* (2013.01); *B60K 5/1208* (2013.01); *F16F 13/10* (2013.01); *F16F 13/22* (2013.01); *F16F 13/26* (2013.01); *F16F 2228/066* (2013.01); *F16F 2230/183* (2013.01)

(58) Field of Classification Search
CPC .. F16F 13/10; F16F 13/22; F16F 13/26; F16F 2230/183; F16F 2228/066; B60K 5/1208; B60K 5/1283
See application file for complete search history.

(56) References Cited

U.S. PATENT DOCUMENTS 5,170,998 A * 12/1992 Muramatsu ............. F16F 13/26
                                                            180/312
5,215,294 A *  6/1993 Muramatsu ............. F16F 13/26
                                                            267/140.13

(Continued)

FOREIGN PATENT DOCUMENTS

| KR | 10-2013-0003749 A | 1/2013 |
| KR | 10-2013-0003751 A | 1/2013 |
| KR | 10-2016-0100053 A | 8/2016 |

*Primary Examiner* — Melody M Burch (74) *Attorney, Agent, or Firm* — Morgan, Lewis & Bockius LLP (57) ABSTRACT

A smart active mount apparatus configured for removing a complicated wiring for connecting a controller, a mount, and an engine ECU, a vacuum negative pressure hose, and a controller may include an insulator disposed in a case to define a liquid chamber; a lower orifice plate disposed in the case to partition the liquid chamber into upper and lower liquid chamber; an upper orifice plate disposed above the lower orifice plate; a membrane disposed between the lower and upper orifice plates; a diaphragm disposed under the lower orifice plate, an air chamber defined between the membrane and the lower orifice plate; a solenoid valve connected to the air chamber; and a generator disposed to the diaphragm, the generator generating electrical energy by movement or deformation of the diaphragm to supply the electrical energy as actuating power of the solenoid valve.

7 Claims, 4 Drawing Sheets

(56) References Cited

U.S. PATENT DOCUMENTS

| | | | | |
|---|---|---|---|---|
| 2007/0263887 A1* | 11/2007 | Tanner | .................... | F04B 43/04 |
| | | | | 381/190 |
| 2009/0033055 A1* | 2/2009 | Morris | ............... | B60G 17/0155 |
| | | | | 280/124.16 |
| 2010/0033996 A1* | 2/2010 | Kono | ...................... | H02M 7/48 |
| | | | | 363/37 |
| 2010/0102492 A1* | 4/2010 | Lee | ........................ | F16F 13/26 |
| | | | | 267/121 |

* cited by examiner

SMART ACTIVE MOUNT

CROSS-REFERENCE TO RELATED APPLICATION

The present application claims priority to Korean Patent Application No. 10-2017-0039787 filed on Mar. 29, 2017, the entire contents of which is incorporated herein for all purposes by this reference.

BACKGROUND OF THE INVENTION

Field of the Invention

The present invention relates to a vehicle mount. More particularly, it relates to a smart active mount configured for removing a complicated wiring for connecting a controller, a mount, and an engine ECU, a vacuum negative pressure hose, and a controller, to achieve a reduction in cost and weight and an improvement in package layout.

Description of Related Art

As technologies for vehicles are developed and consumer demands for low vibration and low noise increase, efforts have been continuously made to maximize the ride quality of vehicles by analyzing noises, vibrations, and shocks.

The vibration, which occurs in a specific RPM region of an engine while a vehicle travels, is transferred to the internal of the vehicle through the vehicle body in a specific frequency, in which case the explosive components of the engine greatly affect the internal of the vehicle.

In general, vibrations structurally always occur in the engine of the vehicle by a periodic variation of central position due to the vertical motion of a piston and a connecting rod, a force of inertia of a reciprocating portion axially acting in a cylinder, a force of inertia of the connecting rod rolling from side to side of a crankshaft, a periodic variation of torque applied to the crankshaft, etc.

Accordingly, an engine mount is mounted between the engine and the vehicle body to support the engine and simultaneously attenuate the noise and vibration transferred from the engine. The engine mount is largely classified into a rubber type engine mount, an air damping mount, and a fluid-sealed type engine mount.

Among them, the fluid-filled type engine mount (fluid mount) has a structure in which a fluid filled under an insulator flows into upper and lower liquid chambers to generate a damping force. The fluid-filled type engine mount has an advantage of attenuating all of high-frequency vibration (small displacement vibration) and low-frequency vibration (large displacement vibration) with the occasion.

In recent years, an active engine mount, a semi-active mounts, etc. have been developed to improve the vibration isolation characteristic of the fluid-filled type engine mount.

The active engine mount generates a control force of the same frequency as a vibration component that causes the worst NVH (Noise, Vibration, and Harshness) performance, to reduce a vibration transferred to a vehicle body from among vibrations applied to the engine mount according to the driving state, engine state, and acceleration signal of a vehicle, improving the ride quality and traveling performance of the vehicle.

Various types of semi-active mounts are included in Korean Patent Application Publication Nos. 10-2013-0003749 and 10-2013-0003751 and the like.

In general, a semi-active mount disposed between an engine, i.e. a power train and a vehicle body effectively reduces vibration caused due to the driving of the engine by controlling the dynamic characteristic of the mount in an on/off manner.

The semi-active mount is classified into a vacuum negative pressure type semi-active mount that includes an internal passage connecting upper and lower liquid chambers and an air chamber connected to an atmosphere supply passage to function as a characteristic variation means and that controls the internal passage in a by-pass manner, and an electronic semi-active mount that controls an internal passage in a volume-stiffness manner by a solenoid valve.

Figure 1:
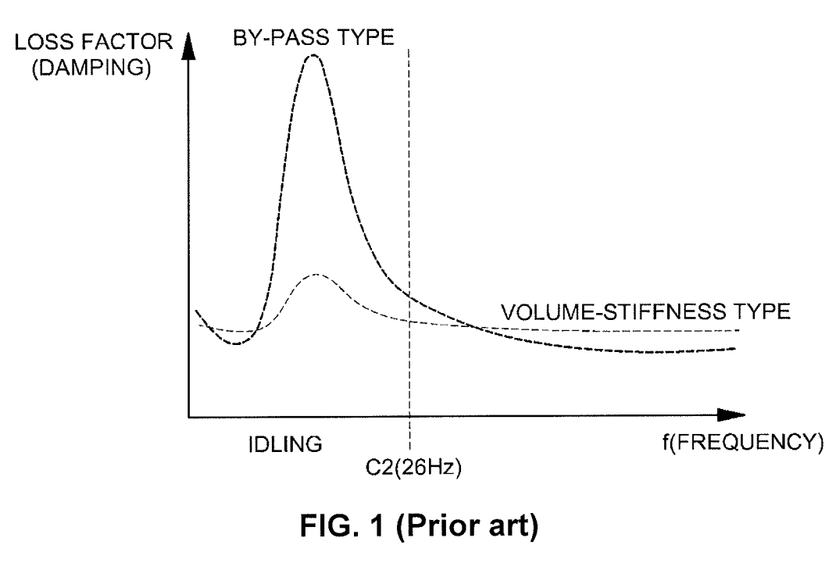
FIG. 1 is a graph illustrating loss factors of mounts in by-pass and volume-stiffness manners.

The semi-active mounts of the by-pass and volume-stiffness manners tend to be differently embodied or have different dynamic characteristics. As illustrated in FIG. 1, the semi-active mount of the by-pass manner has a higher loss factor (damping) than the semi-active mount of the volume-stiffness manner in a low-frequency region.

Figure 2:
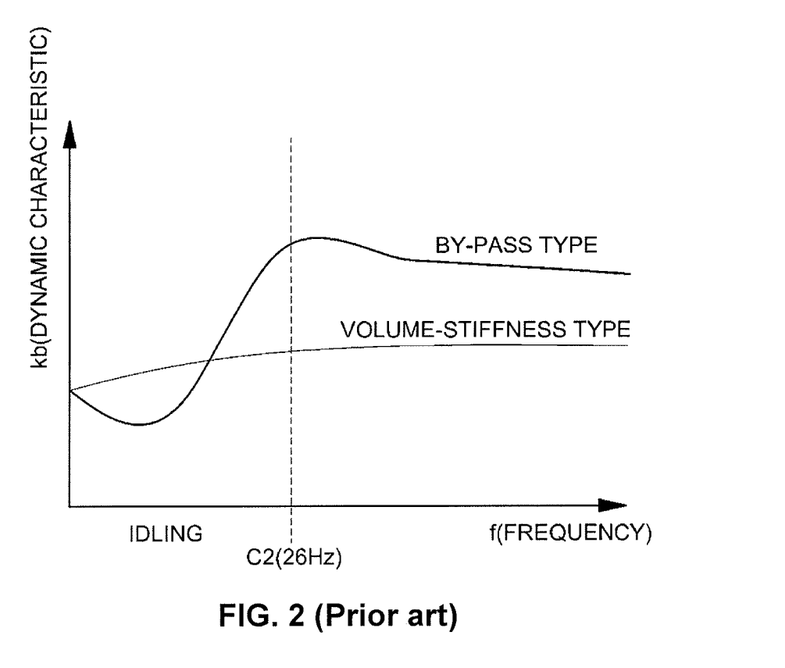
FIG. 2 is a graph illustrating dynamic characteristics of mounts in by-pass and volume-stiffness manners.

As illustrated in FIG. 2, the semi-active mount of the by-pass manner has a lower dynamic characteristic than the semi-active mount of the volume-stiffness manner in a low-frequency region, whereas the semi-active mount of the by-pass manner has a higher dynamic characteristic than the semi-active mount of the volume-stiffness manner in a high-frequency region.

The typical semi-active mount of the by-pass manner mainly uses a vacuum pressure in the engine (intake manifold), but it may make a difficult layout or cause a damage to combustion back pressure.

Meanwhile, the loss factor (damping) and dynamic characteristic of the electronic semi-active mount controlled in the volume-stiffness manner may be controlled using the electronic solenoid valve as an actuator, and the electronic solenoid valve is open or closed so that the air chamber as the characteristic variation means may selectively communicate with the atmosphere.

That is, when the solenoid valve, which is controlled to be electronically openable or closable, is closed, an air flow is blocked between the air chamber and the atmosphere, and the air chamber becomes solid while sealing therein. Therefore, the loss factor (damping) of the mount is increased to improve the ride quality of the vehicle.

On the other hand, when the solenoid valve is opened, air flows between the air chamber and the atmosphere. Consequently, the air chamber becomes soft to decrease the dynamic characteristic of the semi-active mount (to improve isolation performance).

In addition, the solenoid valve is open such that air may flow into/from the air chamber while the vehicle idles (a decrease in dynamic characteristic), whereas the solenoid valve is closed such that air may be kept in the air chamber and be blocked between the air chamber and the atmosphere while the vehicle travels (an increase in loss factor).

The loss factor and the dynamic characteristic of the semi-active mount may be controlled to open or close the gap between the air chamber and the atmosphere using the solenoid valve, and the solenoid valve may be controlled with low power.

The electronic semi-active mount has a lower high-frequency dynamic characteristic (in a wide region) than the vacuum negative pressure type semi-active mount and uses an electromagnetic force. Accordingly, the electronic semi-active mount does not affect engine power because there is no damage to combustion pressure. In addition, the application of the electronic semi-active mount has been increasing since the electronic semi-active mount uses wires (wirings), the layout of which is easily set, instead of hoses for transfer of vacuum negative pressure.

Meanwhile, a traveling vibration reduction conflicts with an idling vibration reduction in the engine mounting technology.

The engine mount may have a high loss factor (damping) to improve traveling vibration, and may have a low dynamic characteristic in a low-frequency region to improve idling vibration.

However, since the fluid mount has a high dynamic characteristic when the damping of the fluid mount is large due to the characteristics thereof, the isolation factor of the fluid mount is poor. When the dynamic characteristic of the fluid mount is low, the damping thereof is small.

Accordingly, it is difficult for the engine mount to simultaneously satisfy the traveling vibration reduction and the idling vibration reduction.

Thus, the application of the semi-active mount, the characteristics of which vary for each traveling condition, has been extended.

To increase damping performance while the vehicle travels and decrease dynamic characteristics while the vehicle idles, the semi-active mount is controlled in electronic and vacuum negative pressure manners.

However, the semi-active mount needs many additional devices including a high-priced controller connected to an engine ECU, a complicated wiring for connecting the controller, the mount (solenoid valve), and the engine ECU, and a vacuum negative pressure hose, besides the solenoid valve as an actuator, which may lead to an increase in cost and weight.

In addition, it is difficult to apply the semi-active mount since it is disadvantageous in terms of surrounding package layout.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a smart active mount configured for removing a complicated wiring for connecting a controller, a mount, and an engine ECU, a vacuum negative pressure hose, and a controller, to achieve a reduction in cost and weight and an improvement in package layout.

Various aspects of the present invention are directed to providing a smart active mount for a vehicle, the smart active mount being configured for automatically controlling traveling vibration (an increase in damping and loss factor) and idling vibration (a decrease in dynamic characteristic) without a controller according to the driving condition of a vehicle and an engine.

In an exemplary embodiment, a smart active mount includes an insulator disposed in a case to fix an internal core and define a liquid chamber, a lower orifice plate disposed in the case to partition the liquid chamber into an upper liquid chamber and a lower liquid chamber, and having an orifice to guide a fluid flow between the upper liquid chamber and the lower liquid chamber, an upper orifice plate disposed above the lower orifice plate, a membrane disposed between the lower orifice plate and the upper orifice plate, a diaphragm disposed under the lower orifice plate in the case to define the lower liquid chamber together with the lower orifice plate, an air chamber defined between the membrane and the lower orifice plate, a solenoid valve connected to the air chamber and open or closed such that the air chamber selectively communicates with the atmosphere, and a generator disposed to the diaphragm, the generator generating electrical energy by movement or deformation of the diaphragm to supply the electrical energy as actuating power of the solenoid valve.

The solenoid valve may be a normally-open type solenoid valve configured to be closed with the electric power from the generator applied thereto as actuating power.

The smart active mount may further include a power converter configured to convert electric power output from the generator to supply the electric power as the actuating power of the solenoid valve.

The power converter may include a rectifier circuit configured to convert AC power output from the generator into DC power to apply the converted DC power to the solenoid valve.

In addition, an output terminal of the generator may be directly connected to an input terminal of the power converter through a wiring, and an output terminal of the power converter, from which the converted electric power is output, may be directly connected to a power input terminal of the solenoid valve through a wiring.

The generator may be a nano-generator disposed integrally or monolithically to a diaphragm, the nano-generator including an electrode and a composite including a nano-particle-sized piezoelectric material.

The nano-generator may have a structure where the composite is laminated on the diaphragm as a substrate.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be in part determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

In the whole description, it will be understood that when a component is referred to as being "comprising" any component, it does not exclude other components, but can further includes the other components unless otherwise specified.

Various aspects of the present invention are directed to providing a smart active mount configured for removing a complicated wiring for connecting a controller, a mount, and an engine ECU, a vacuum negative pressure hose, and a controller, and of achieving a reduction in cost and weight and an improvement in package layout.

Various aspects of the present invention are directed to providing a smart active mount for a vehicle, configured for automatically controlling traveling vibration (an increase in damping and loss factor) and idling vibration (a decrease in dynamic characteristic) without a controller according to the driving condition of a vehicle and an engine.

The smart active mount of the present invention may be used as a vehicle mount. The smart active mount is applicable to a power train in the vehicle, and is usefully applicable as an engine mount of the vehicle.

The smart active mount of the present invention is to improve a conventional electronic active mount, which includes a solenoid valve and controls vibration in a volume-stiffness, from among fluid-filled type mounts. Hereinafter, a smart active mount according to an exemplary embodiment of the present invention will be described with reference to FIG. 3.

Figure 3:
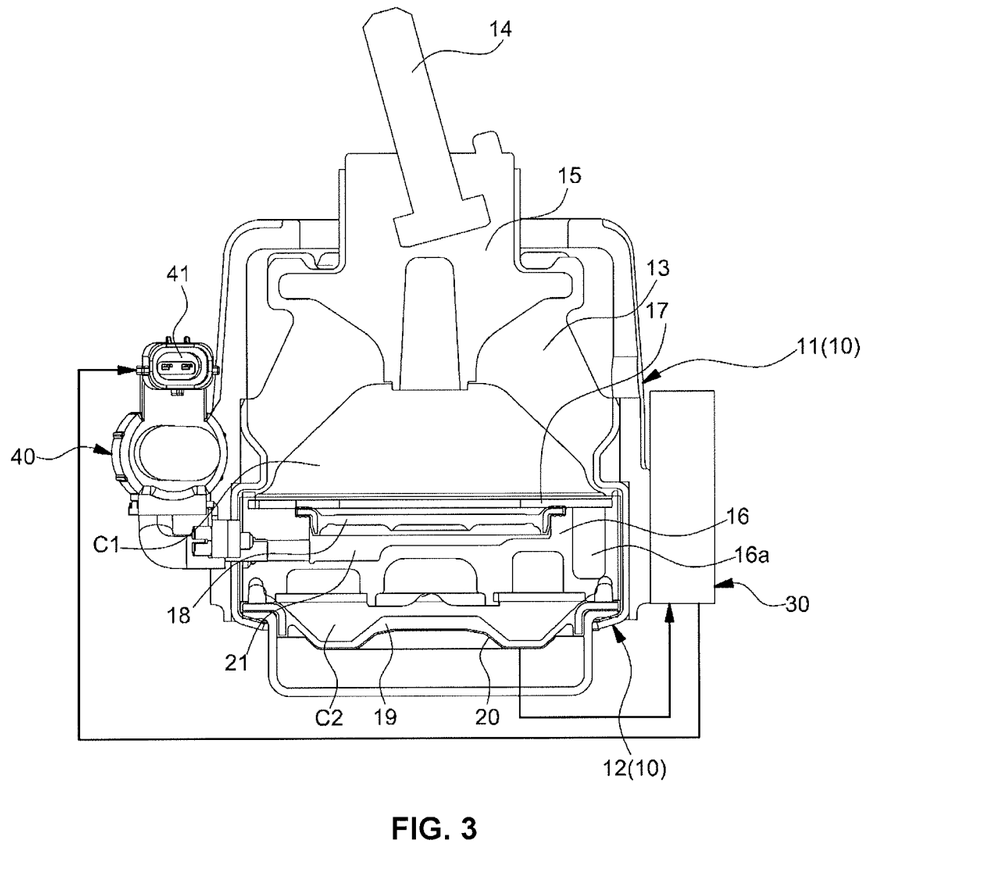
FIG. 3 is a cross-sectional view illustrating a configuration of a smart active mount according to an exemplary embodiment of the present invention.

FIG. 3 is a cross-sectional view illustrating a configuration of a smart active mount according to an exemplary embodiment of the present invention.

The smart active mount according to the exemplary embodiment of the present invention is disposed between a device to be mounted including an engine and a vehicle body for vibration isolation, and includes a center bolt 14 fastened to the device to be mounted (e.g., the engine), an internal core 15 through which the center bolt 14 is coupled, and an insulator 13 that is formed integrally with the internal core 15 and includes a rubber material.

The insulator 13 is also called a main rubber or a mount rubber, is positioned at the upper portion of a case 10 to fix the internal core 15, and defines a liquid chamber therein.

The case 10 includes an upper body 11 and a lower body 12, and is assembled by fitting the lower portion of the insulator 13 into the lower body 12 of the case 10. In the instant case, the lower body 12 of the case 10 is coupled to surround the lower portion of the insulator 13.

The lower body 12 of the case 10 is fastened to the vehicle body through a mounting bracket.

In the case 10, the liquid chamber is partitioned into an upper liquid chamber C1 and a lower liquid chamber C2, and a lower orifice plate 16 having an orifice 16a is disposed to guide a fluid flow between the upper liquid chamber C1 and the lower liquid chamber C2.

In addition, the lower orifice plate 16 is provided with a membrane 18.

In the instant case, an upper orifice plate 17 is assembled above the lower orifice plate 16 in the case 10, and the membrane 18 may be inserted and disposed between the lower orifice plate 16 and the upper orifice plate 17.

The upper orifice plate 17 has a hole formed therein, and the upper liquid chamber C1 communicates with the orifice 16a as a fluid passage of the lower orifice plate 16 through the hole of the upper orifice plate 17 so that a fluid may flow therebetween.

In addition, a diaphragm 19 defining the lower liquid chamber C2 is disposed under the lower orifice plate 16 in the case 10.

The mount having the above configuration has the upper liquid chamber C1 between the lower orifice plate 16 and the insulator 13 and the lower liquid chamber C2 between the lower orifice plate 16 and the diaphragm 19.

Accordingly, the insulator 13 and the diaphragm 19 define the liquid chamber in the case 10, and the lower orifice plate 16 and the membrane 18 partition the liquid chamber into the upper liquid chamber C1, which is defined between the lower orifice plate 16 and the insulator 13 to be filled with a fluid, and the lower liquid chamber C2 which is defined between the lower orifice plate 16 and the diaphragm 19 to be filled with a fluid.

The diaphragm 19 may be deformed according to the vibration state applied to the mount, the fluid flow state between the upper and lower liquid chambers C1 and C2 due to vibration, and the fluid pressure state in the lower liquid chamber C2. When the diaphragm 19 is deformed, the capacity of the lower liquid chamber C2 filled with the fluid is also changed.

In addition, an air chamber 21 configured as a characteristic variation means is provided between the membrane 18 and the lower orifice plate 16 in the case 10, and air flows into/out of the air chamber 21 from/into the atmosphere.

In addition, a solenoid valve 40 operated by electric power supplied thereto is disposed for connection to the air chamber 21, and is positioned outside the case 10.

The solenoid valve 40 is open or closed such that the air chamber 21 selectively communicates with the atmosphere, and may be a normally-open type valve.

That is, the present invention may use a normally-open type solenoid valve 40 configured such that when actuating power is applied to a solenoid coil, the valve is closed in a normally open state. The solenoid valve 40 is in an open state by a spring built therein (off state) when the actuating power is not applied thereto, whereas the solenoid valve 40 is closed (on state) only when the actuating power is applied thereto.

Accordingly, in the smart active mount according to the exemplary embodiment of the present invention, when the solenoid valve 40 is closed by the actuating power supplied thereto, an air flow is blocked between the air chamber 21 and the atmosphere. Consequently, since the air chamber 21 is sealed therein to become solid, the loss factor (damping) of the mount is increased.

On the other hand, when the actuating power is not supplied to the solenoid valve 40 and the solenoid valve 40 is opened, air flow between the air chamber 21 and the atmosphere. Consequently, since the air chamber 21 becomes soft, the dynamic characteristic of the mount is decreased (isolation performance is improved).

Meanwhile, the smart active mount according to the exemplary embodiment of the present invention includes a generator 20 that generates electrical energy by the deformation of the diaphragm 19 according to the vibration state applied to the mount, the fluid flow state between the upper and lower liquid chambers C1 and C2 due to vibration, and the fluid pressure state in the lower liquid chamber C2.

In the instant case, the generator 20 may be a nano-generator that includes a nano-composite, having a nano-particle-sized piezoelectric material generating electrical energy when a physical force including pressure or bending is applied thereto, and an electrode, and the nano-generator 20 may be installed integrally to the diaphragm 19.

The nano-generator 20 is configured using the nano-composite, which includes piezoelectric nanoparticles, i.e. a nanoscale particle-sized piezoelectric material, generating electrical energy when a physical force is applied thereto, in which case the nano-generator 20 may be integrated with the diaphragm 19 using the diaphragm 19 as a substrate on which the composite is laminated. Through such a structure, the nano-generator 20 on the diaphragm 19 generates electricity according to the movement and deformation of the diaphragm 19.

The smart active mount according to the exemplary embodiment of the present invention is characterized in that the nano-generator 20 integrated with the diaphragm autonomously generates electricity when a physical force including bending is applied to the diaphragm 19 disposed in the case 10.

Since the nano-generator 20 including the composite having piezoelectric nanoparticles is formed integrally on the diaphragm 19 in the smart active mount according to the exemplary embodiment of the present invention, the nano-generator 20 autonomously generates electric power to operate the solenoid valve 40.

When large external vibration is applied to the mount through the center bolt 14 and the internal core 15, the diaphragm 19 is repeatedly deformed by pressure or force transferred through a fluid, and the nano-generator 20 generates electricity during the repeated deformation including bending of the diaphragm 19.

In the smart active mount according to the exemplary embodiment of the present invention, the power converter 30 converts the electrical energy, which is generated in the nano-generator 20 by the repeated deformation of the diaphragm 19 according to the large vibration applied thereto, into DC power, and the converted DC power is supplied to the solenoid valve 40 as actuating power.

The power converter 30 converts the power generated by the nano-generator 20 integrated with the diaphragm 19 into DC power to supply the DC power as actuating power of the solenoid valve 40. In the case where the solenoid valve 40 is a normally-open type valve, the solenoid valve 40 is closed (operation on) whenever the nano-generator 20 generates electric power by the deformation of the diaphragm 19, namely when electrical energy (electric power) generated by the operation of the nano-generator 20 is applied thereto.

In addition, when the nano-generator 20 does not generate electric power, namely when the diaphragm 19 is not deformed so that the nano-generator 20 does not generate electric power, actuating power is not supplied to the solenoid valve 40 so that the solenoid valve 40 is maintained in an open state (operation off).

The known solenoid valve 40 disposed to the mount may be operated and controlled with low power, and therefore the solenoid valve 40 may be open or closed with the electric power of the piezoelectric nano-generator 20.

In the smart active mount according to the exemplary embodiment of the present invention, the electric power generated by the nano-generator is selectively applied to the solenoid valve according to whether or not the diaphragm is deformed and the nano-generator generates electric power, and the solenoid valve is open or closed according to whether or not electric power is applied thereto.

In the related art, there is provided a separate controller connected to an engine ECU and the controller controls the opening or closing of a solenoid valve based on the vehicle driving information including an engine RPM received from the engine ECU. However, in the smart active mount according to the exemplary embodiment of the present invention, when the nano-generator 20 integrated with the diaphragm 19 autonomously generates electric power, without a separate controller and without the process of electronically controlling the solenoid valve by the controller, the solenoid valve 40 is automatically operated by the electric power transferred from the diaphragm 19 through the power converter 30.

The nano-generator configured to generate electricity from the composite having the piezoelectric nanoparticles is already developed and known through various studies, and various types or forms of piezoelectric materials are known.

The nano-generator is a generator that generates electricity using a nanoparticle-sized piezoelectric material, and includes an electrode and a plate composite having a piezoelectric material therein. The nano-generator uses a piezoelectric effect that is a characteristic of generating electricity when a physical force including pressure or bending is applied to the composite.

There is known zinc oxide (ZnO) applied in the world's first nano-generator concept provided by professor Wang, Zhong Lin team, Georgia Tech., USA, in 2005, as the piezoelectric material for development of the nano-generator.

In addition, professor Wang's team developed a nano-generator with more improved efficiency using barium oxide titanate (BaTiO$_3$) as a ceramic thin membrane material having a 15 to 20 times higher piezoelectric characteristic than zinc oxide in 2010.

Nano-generators have been recently developed by many researchers, and there have been developed various nano-generators that can be produced in large scale with low cost using nano-composites.

In addition, since the latest nano-generator is manufactured by a simple coating process using a piezoelectric material including barium oxide titanate, it can be easily manufactured with low cost in a wide area.

Figure 4:
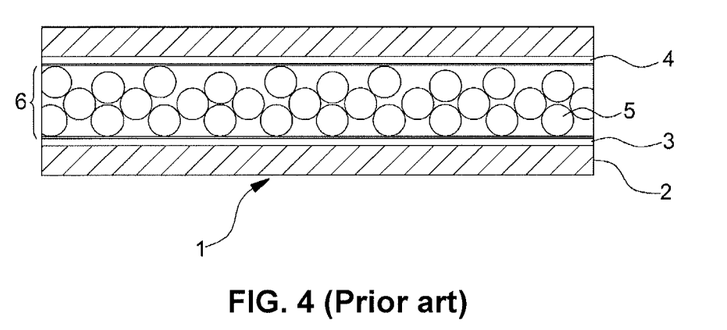
FIG. 4 is a cross-sectional view illustrating a configuration of a nano-generator.

For example, there is known a nano-generator 1 that includes a flexible substrate 2, electrodes 3 and 4, and a composite layer (piezoelectric element layer) 6 as a composite having piezoelectric nanoparticles 5, which are laminated thereon, as illustrated in FIG. 4.

In addition, there is known a laminated flexible nano-generator in which a piezoelectric element layer including piezoelectric nanoparticles and high polymer is laminated on a flexible substrate in a multi-layer manner (Korean Patent Application Publication No, 10-2016-0100053, etc.)

In addition, there is known a technique for manufacturing a nano-generator having a large area of membrane structure by a simple coating process of coating a substrate with a mixture obtained by mixing barium oxide titanate as high-efficiency piezoelectric nanoparticles and carbon nanotube or graphene oxide (RGO) having a large specific surface area and high electrical conductivity with polydimethylsiloxane (PDMS).

Accordingly, in the smart active mount according to the exemplary embodiment of the present invention, when the diaphragm formed as a large area of rubber membrane is coated with a composite material including a nanoparticle-sized piezoelectric material including barium oxide titanate, using the above nano-generator manufacturing technique, the volume-stiffness type diaphragm may be configured as a nano-complex self-generator.

The present invention is not specifically limited to the configuration or manufacturing method of the nano-generator. The present invention may adopt or use one of known nano-generators as long as the nano-generator generates electrical energy by applying a physical force to a composite material including piezoelectric nanoparticles (piezoelectric material) when the diaphragm is deformed, for example bent.

In addition, the present invention is not specifically limited to the type or form of piezoelectric material and the type of a mixture constituting composite material together with piezoelectric material. Since various nano-generators are known, the detailed description of the configuration and manufacturing method thereof will be omitted.

In addition, the nano-generator 20 integrated with the diaphragm 19 may be formed by attaching and fixing a separate nano-generator to the thin membrane of a diaphragm using adhesive or a fixing means. Alternatively, the nano-generator 20 integrated with the diaphragm 19 may be formed by coating a diaphragm as a substrate with a composite material including piezoelectric nanoparticles.

Figure 5:
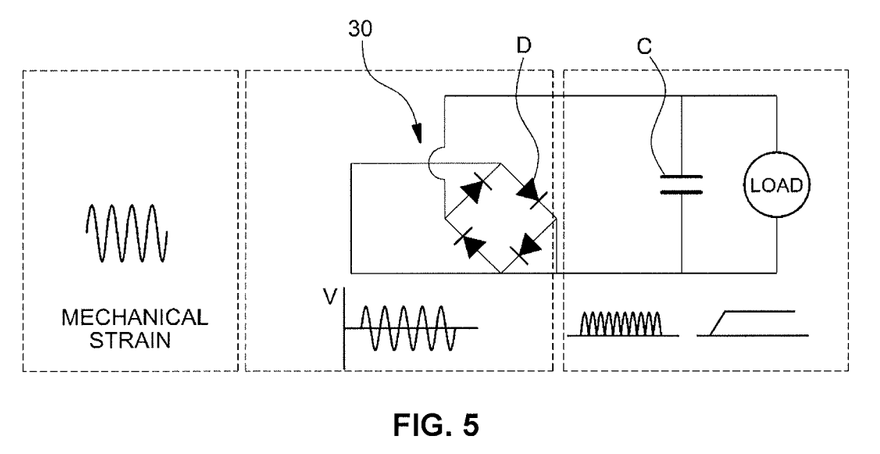
FIG. 5 is a diagram illustrating a configuration of a power converter in the smart active mount according to the exemplary embodiment of the present invention.

FIG. 5 is a diagram illustrating an example of the power converter that converts the AC power generated by piezoelectric energy, i.e. the deformation including bending of the diaphragm, and illustrates a simple full-bridge converter as the power converter that includes a rectifier circuit using a diode D and a capacitor C.

In FIG. 5, a load refers to a solenoid valve.

FIG. 5 illustrates the full-bridge type power converter 30 configured to convert the electrical energy generated by the nano-generator from AC power into DC power and to apply the converted DC power to the solenoid valve 40 as an actuator, a solenoid coil in the vale. The present invention is not limited thereto.

Since there are known various power converters that convert AC power into DC power by rectifying generated electric power and then output the converted power, the detailed description thereof will be omitted in an exemplary embodiment of the present invention. The present invention may adopt and use proper one of known power converters, considering the output of the nano-generator.

In the exemplary embodiment of the present invention, an electrode as the output terminal of the nano-generator 20 integrated with the diaphragm 19 is directly connected to an input terminal of the power converter 30 through a wiring, and the output terminal of the power converter 30, from which the converted power is output, is directly connected to a power supply connector 41 as the power input terminal of the solenoid valve 40 through a wiring.

Thus, the electric power generated by the nano-generator 20 may be input to the power converter 30 to be converted into DC power, and the converted DC power output from the power converter 30 may be supplied to the solenoid valve 40.

Accordingly, the nano-generator 20 generates electric power when the diaphragm 10 is moved and deformed by vibration in the smart active mount according to the exemplary embodiment of the present invention, and the electric power is used to operate the solenoid valve 40.

The electric power generated by the nano-generator 20 increases when the movement of the diaphragm 19 increases for example while the vehicle travels on the rough road, and the solenoid valve 40 may be operated to be closed when the electric power generated by the nano-generator 20 increases and reaches a certain level.

On the other hand, the diaphragm 19 is slightly moved or not moved while the engine idles. Therefore, since the nano-generator 20 does not generate electric power or generates a small amount of electric power, the solenoid valve 40 is closed by the spring built therein.

The smart active mount according to the exemplary embodiment of the present invention does not include an additional energy storage device or a separate controller. The nano-generator 20 autonomously generates and outputs electric power only when the diaphragm 19 is moved (deformed, for example bent) without a specific control process, in which case the solenoid valve 40 as an actuator is automatically operated by the output power.

Hereinafter, the operation of the smart active mount according to the exemplary embodiment of the present invention will be described.

Large vibration occurs due to road exciting, vehicle body vibration, movement of a power train, etc. while the vehicle travels, in which case the center bolt 14 and the internal core 15 are vertically largely moved by the external vibration transferred from the engine.

At the same time when the flow of fluid moving from the upper liquid chamber C1 to the lower liquid chamber C2 is increased in the mount, the diaphragm 19 is largely expanded and bent.

In addition, when the internal core 15 is vertically largely moved by vibration, a large flow of fluid occurs between the upper liquid chamber C1 and the lower liquid chamber C2, and the diaphragm 19 continues to be repeatedly expanded and contracted.

Accordingly, the AC power generated by the nano-generator 20 integrated with the diaphragm 19 is input to the power converter 30, and the DC power converted by the power converter 30 is supplied to the solenoid valve 40 as an actuator.

Thus, the normally-open type solenoid valve 40 is closed, and air is kept in the air chamber 21 as a characteristic variation means while the gap between the air chamber 21 and the atmosphere is blocked.

Consequently, the characteristic of the mount is changed to represent the characteristic of the fluid mount, with the consequence that the air chamber 21 becomes solid to improve the ride quality of the vehicle by increasing the loss factor (damping) of the mount.

On the other hand, small vibration is applied to the mount while the engine idles.

In the instant case, the internal core 15 is vertically slightly moved and thus the diaphragm 19 is not changed and deformed (or is slightly deformed). Therefore, the nano-generator 20 does not generate electric power (or generates slight electric power insufficient to operate the solenoid valve).

Thus, since electric power is not supplied to the solenoid valve 40, the solenoid valve 40 is open by the force of the spring and is in a state in which air flows into/out of the air chamber 21, i.e. in a state in which the air chamber 21 is open toward the atmosphere.

Consequently, the characteristic of the mount is changed to represent a volume-stiffness characteristic, with the consequence that the dynamic characteristic of the mount is decreased and vibration isolation performance between the engine and the vehicle body is increased.

Through such a structure, in the smart active mount according to the exemplary embodiment of the present invention, the nano-generator formed integrally in the diaphragm is operated to be automatically turned on/off according to the movement of the diaphragm, and the solenoid valve operated by electric power of the nano-generator is automatically turned on/off according to whether or not electric power is supplied thereto from the nano-generator, removing a complicated wiring for connecting a controller, a mount, and an engine ECU, and a vacuum negative pressure hose, as well as a conventional controller for controlling the operation of the solenoid valve.

Thus, it is obviously possible to reduce the number of parts, and to achieve a reduction in cost and weight and an improvement in package layout.

As is apparent from the above description, in a smart active mount of the present invention, a nano-generator formed integrally in a diaphragm is operated to be automatically turned on/off according to the movement of the diaphragm, and a solenoid valve operated by electric power of the nano-generator is automatically turned on/off according to whether or not electric power is supplied thereto from the nano-generator, removing a complicated wiring for connecting a controller, a mount, and an engine ECU, and a vacuum negative pressure hose, as well as a conventional controller for controlling the operation of the solenoid valve.

Thus, it is obviously possible to reduce the number of parts, and to achieve a reduction in cost and weight and an improvement in package layout.

The smart active mount of the present invention is usefully applicable as an engine mount.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A smart active mount apparatus comprising:
    an insulator disposed in a case to fix an internal core and define a liquid chamber;
    a lower orifice plate disposed in the case to partition the liquid chamber into an upper liquid chamber and a lower liquid chamber, and having an orifice to guide a fluid flow between the upper liquid chamber and the lower liquid chamber;
    an upper orifice plate disposed above the lower orifice plate;
    a membrane disposed between the lower orifice plate and the upper orifice plate;
    a diaphragm disposed under the lower orifice plate in the case to define the lower liquid chamber together with the lower orifice plate between the lower orifice plate and the diaphragm;
    an air chamber defined between the membrane and the lower orifice plate;
    a solenoid valve connected to the air chamber, wherein the air chamber selectively fluidically-communicates with the atmosphere; and
    a generator disposed to the diaphragm, the generator generating electric power by movement or deformation of the diaphragm to supply the electric power as actuating power of the solenoid valve,
    wherein the generator generates the electric power when the movement of the diaphragm increases while a vehicle travels on a predetermined road, and the solenoid valve is operated to be closed when the electric power generated by the generator reaches a predetermined level, and
    wherein the generator generates the electric power which does not reach the predetermined level by the movement of the diaphragm while an engine idles, and the solenoid valve is operated to be opened when the electric power generated by the generator does not reach the predetermined level.

2. The smart active mount apparatus of claim 1, wherein while the vehicle travels on the predetermined road, a flow of fluid moving from the upper liquid chamber to the lower liquid chamber is increased by moving of the internal core so that the diaphragm is moved and deformed.

3. The smart active mount apparatus of claim 1, further including a power converter configured to convert the electric power output from the generator to supply the electric power as the actuating power of the solenoid valve.

4. The smart active mount apparatus of claim 3, wherein the power converter includes a rectifier circuit configured to convert AC power output from the generator into DC power to apply the converted DC power to the solenoid valve.

5. The smart active mount apparatus of claim 3, wherein an output terminal of the generator is directly connected to an input terminal of the power converter through a wiring, and an output terminal of the power converter, from which the converted electric power is output, is directly connected to a power input terminal of the solenoid valve through a wiring.

6. The smart active mount apparatus of claim 1, wherein the generator is a nano-generator installed integrally to the diaphragm, the nano-generator including an electrode and a composite including a nanoparticle-sized piezoelectric material.

7. The smart active mount apparatus of claim 6, wherein the nano-generator has a structure where the composite is laminated on the diaphragm as a substrate.

\* \* \* \* \*